United States Patent [19]

Willyoung et al.

[11] Patent Number: 4,503,681
[45] Date of Patent: Mar. 12, 1985

[54] STATE-OF-THE-ART GAS TURBINE AND STEAM TURBINE POWER PLANT

[75] Inventors: David M. Willyoung, Scotia; Ashok K. Anand, Clifton Park, both of N.Y.

[73] Assignee: General Electric Company, Schenectady, N.Y.

[21] Appl. No.: 513,934

[22] Filed: Jul. 14, 1983

[51] Int. Cl.³ .............................................. F01K 23/04
[52] U.S. Cl. ....................................... 60/655; 60/649; 60/683
[58] Field of Search .................. 60/649, 650, 655, 673, 60/682, 683, 698, 716

[56] References Cited

U.S. PATENT DOCUMENTS

| | | | |
|---|---|---|---|
| 3,693,347 | 9/1972 | Kydd et al. | 60/39.05 |
| 3,978,661 | 9/1976 | Cheng | 60/39.55 |
| 4,116,005 | 9/1978 | Willyoung | 60/655 |
| 4,223,529 | 9/1980 | Willyoung | 60/39.18 A |
| 4,253,300 | 3/1981 | Willyoung | 60/39.18 B |

OTHER PUBLICATIONS

A Solid Fueled Gas Turbine Cogeneration System for the Mineral Processing Industries, J. Adams, J. L. Brown, Fourth World Energy Engineering Congress, Oct. 12-15, 1981, pp. 147-151.
The External Combustion Steam Injected Gas Turbine for Cogeneration, K. P. Boyce et al., Society of Automotive Engineers, Inc. Paper 789534, pp. 860-865 (1978).

Primary Examiner—Stephen F. Husar
Attorney, Agent, or Firm—J. C. Squillaro

[57] ABSTRACT

A state-of-the-art power plant in which the heat from solid or low quality fuels is utilized to heat indirectly a motive stream composition of a mixture of steam and gases to drive a gas turbine. The thermal energy from the burning of the solid or low quality fuels is also utilized to generate steam which powers a steam turbine. Excess steam may be generated to be utilized as process steam.

13 Claims, 4 Drawing Figures

STATE-OF-THE-ART GAS TURBINE AND STEAM TURBINE POWER PLANT

BACKGROUND OF THE INVENTION

The present invention relates to a gas turbine power plant, and more particularly to a power plant having a state-of-the-art steam turbine and a state-of-the-art gas turbine in which the gas turbine is driven by a mixture of gases and steam.

Typically, gas turbine power plants are powered by the combustion of clean fuels such as distillate oil or natural gas, which combustion products are passed through the gas turbine to drive the turbine. At rated conditions, such combustion products of clean fuels may reach temperatures in the range of about 1730°–2120° F. and gas pressures of up to 7 to 12 atmospheres prior to being expanded through the turbine. The metals in the state-of-the-art gas turbines are able to withstand the corrosive and erosive action of the combustion products of clean fuels as well as these temperature levels. Accordingly, such simple cycle gas turbines are able to reach efficiencies of approximately 30%, despite high levels of temperature and heat energy carried away in the exhaust gases. Unit ratings tend to be restricted, because of these difficult design requirements, but ratings from a few hundred kilowatts to over 100 megawatts are in commercial service.

Steam driven power plants are also used. They can be built economically for a larger range of ratings and in larger sizes than simple cycle gas turbines. Steam temperatures as high as 1000° F.–1050° F., with pressures of up to several hundred atmospheres are common. Overall plant efficiency levels of 33-36% have been achieved (despite the relatively lower maximum steam temperatures) because very little of the theoretically available energy is left in the power plant discharge streams of stack gas (250°–300° F.) or condenser cooling water (85°–100° F.). The steam generating furnaces for steam power plants have successfully burned a wide range of low-grade, unclean fuels such as solid coal, coke, lignite, industrial wastes; lower grade liquid fuels such as residual oils and tars; as well as premium "clean" fuels such as natural gas, when the latter was justified by favorable fuel prices, fuel availability, and the lower costs for pollution control. However, the thermal efficiency of these steam power plants is not as high when the lower grade fuels are used because of their more difficult combustion control conditions and the energy requirements of the pollution control system.

Each system (simple cycle gas turbines or steam turbines) has been utilized depending on the needs of the particular electric utility or industrial system. In the recent past, shortages of the clean fuels (distillate oil or natural gas) has caused their price to increase more rapidly than that of solid fuels (coal, wood, wastes, etc.). The United States, while it has limited remaining deposits of such clean fuels, has vast quantities of the "less clean" solid fuels such as fossil fuels, including coal, lignite, and peat, and solid renewable fuels including wood, biomass, agricultural waste, municipal waste and industrial waste. Many of these solid fuels are characterized by relatively low energy density, high bulk density, high levels of impurities and, in the case of the renewable fuels, a large fuel collection radius per unit of power generated. The latter application favors many relatively small plants rather than a much larger plant, of course. Accordingly, economic pressure has been exerted on the power plant industry to develop economical power plants which can utilize such low grade solid fuels in small to moderately sized plants at an efficiency which approaches that attainable in gas turbine and steam turbine power plants when they are operated with clean fuels.

When such solid fuels are used in a simple gas turbine cycle or combined gas turbine cycle (gas turbine thermodynamically coupled in any of several well-known arrangements with a steam turbine), they must first be gasified, liquified or reduced to minute dimensions suitable for combustion in solid form in direct air suspension. If significant quantities of erosive or corrosive species exist in the combustion products, they must then be cleaned, before being passed to the turbine. Alternatively, the solid fuels can be burned in an external combustion chamber utilizing heat exchangers to transfer the thermal energy of the combustion gases to a separate clean gas stream so as to exclude corrosive and combustion products which, if passed directly to the gas turbine, would dramatically shorten its life.

Willyoung, U.S. Pat. No. 4,116,005, discloses a system in which gas turbine motive gases are indirectly heated by the combustion of "dirty" (solid) fuels and are utilized to drive a gas turbine that is thermodynamically coupled to a steam turbine. A thermodynamically coupled dual gas turbine/steam turbine (combined cycle) system is utilized to recover thermal energy from the gas turbine exhaust stream to increase the overall efficiency of the power plant. This is desirable since the efficiency of a power plant employing metallic heat exchangers to supply thermal energy to gas turbines tends to be limited because the heat exchangers can only heat the motive gases passing therethrough to temperatures of up to about 1500° F. As pointed out earlier, present state-of-the-art gas turbines can utilize motive gases at temperatures of up to about 2100° F. to obtain high levels of power output and efficiency. When a gas at a lower temperature is passed therethrough, the power and efficiency of the gas turbine are decreased. Accordingly, while the efficiency of the system of Willyoung, U.S. Pat. No. 4,116,005, was an improvement over earlier art, permitting the direct use of solid fuel forms, it did not fully utilize the state-of-the-art capability of the gas turbines.

A different variation of a combined cycle turbine system powered by the burning of solid fuels is found in Willyoung, U.S. Pat. No. 4,223,529 where improvements are described which reduce the combustor size. However, this system again utilized a gas turbine which is driven by gases at less than the present day's state-of-the-art maximum temperature. Thus, again the full capability and efficiency potential of the gas turbines is not achieved.

These limitations are avoided in another power plant to be found in Willyoung, U.S. Pat. No. 4,253,300, in which the gas turbine is driven by "clean" compressed gases. First, there is heated the "clean" gases with lower grade "dirty" fuels in an external heat exchanger to the allowable temperature limits of that heat exchanger. After the compressed gases have passed through and have been heated in the heat exchanger, they are combined with a clean hydrocarbon fuel and the mixture is combusted to bring the motive combustion gas stream to the state-of-the-art temperature capability of the gas turbine, about 1800°–2100° F. This resulting hot gas stream is then expanded through the gas turbine. This system, while resulting in a more effective utilization of the capability of a state-of-the-art gas turbine system, nevertheless draws only a base part of its energy from the combustion of lower-cost, low-quality solid fuels. The remainder of its output, even though obtained at very high incremental efficiency, comes from the burning of more costly "clean" fuel (either naturally obtained or derived by the refining or conversion of "dirtier" natural fuel forms).

There is also the teaching of Kydd, et al, U.S. Pat. No. 3,693,347, which discloses the use of controlling means to optimize injection of steam into combustion gases to drive a gas turbine. The turbine of this system is operated by the burning of clean hydrocarbon fuels and it does not disclose the use of indirect heating of the motive gas stream to drive the gas turbine. Further, there is the teaching of Chang, U.S. Pat. No. 3,978,661, which discloses a turbine which can utilize both steam and gas. However, this disclosure is of a specially designed turbine and does not set forth the utilization or operation of a state-of-the-art gas turbine system.

Accordingly, it is one object of the present invention to provide for a state-of-the-art power plant in which the heat from solid or low quality fuels is utilized both to heat indirectly a motive stream composed of a mixture of steam and gases to drive a a gas turbine and also to generate essentially pure steam which is utilized to power a steam turbine.

It is an additional object of the present invention to provide an improved power plant using state-of-the-art apparatus in which combustion gases formed by the burning of wood or coal are utilized indirectly to heat a motive gaseous stream mixture composed of steam and air to drive a gas turbine and also to form steam to drive a steam turbine.

It is still a further object of the present invention to provide for a low-cost improved power plant utilizing essentially the full capability of state-of-the-art equipment in which solid fuels are burned to form dirt-laden combustion gases in which lower temperature thermal energy from such combustion gases is used indirectly to form steam, said steam being utilized to drive a steam turbine, and wherein spent steam from the steam turbine is mixed with a motive gaseous stream which, in turn, is indirectly heated by higher temperature thermal energy from said combustion gases and then utilized to drive a state-of-the-art gas turbine.

It is yet another object of the present invention to provide an improved gas turbine combined cycle power plant which can utilize "dirty" solid fuel for its primary energy source, and which utilizes state-of-the-art equipment in which a gas turbine is powered by a mixture of steam and air and wherein the overall efficiency of the plant is increased substantially by utilizing the thermal energy in the combustion gas stream just prior to exhaust to produce steam, which steam is used to drive an integrated steam turbine.

It is yet a further object of the present invention to provide a low-cost method for operating an improved gas turbine power plant in which the gas turbine is driven by a gaseous mixture of steam and air which is indirectly heated by the burning of solid fuel, and wherein the efficiency of the overall power plant can reach or exceed about 30%, depending on the moisture content, and hence the stack gas latent heat losses, of the fuel.

These objects of the invention, as well as their attainment are fully disclosed in the Figures described below.

The purpose and function of the different parts of the power plant as set forth in these Figures will be more fully explained below.

SUMMARY OF THE INVENTION

In accordance with the above objects, there is provided by the present invention an improved combined cycle power plant comprising, (A) a state-of-the-art gas turbine apparatus having a turbine section driven by an expanding mixture of hot compressed air and steam, and a compressor section driven by the turbine section for supplying a stream of compressed air;

(B) a combustor for burning a solid fuel to form combustion gases for heating the pressurized gaseous steam/air mixture which drives the turbine section;

(C) a heat exchanger for transferring a portion of the heat energy from the combustion gases to the pressurized gaseous steam/air mixture stream;

(D) a heat recovery steam generator for converting water to a first steam flow; and (E) a state-of-the-art steam turbine to which the first steam flow is passed from the heat recovery steam generator to drive the steam turbine, and from which a second steam flow is directed to be mixed with the stream of compressed air to form the aforesaid pressurized gaseous steam/air mixture.

There are several important points that must be made with respect to the above language. First of all, the term "solid fuel" is meant to include all impure carbonaceous fuels, such as coal, wood, petroleum coke, peat, biomasses, and so forth which, when burned, give off gases and particulate matter. Heat which is released by the burning of such solid fuel is utilized indirectly to heat the motive gas mixture passing through the gas turbine in the first instance and to heat water to form high pressure steam in a heat recovery steam generator.

Further, the term "state-of-the-art gas turbine," refers to a gas turbine system which is specifically made for the burning therein of "clean" hydrocarbon fuel and which is normally powered by the resulting combustion gases which have been heated to a high limiting temperature set by the state-of-the-art gas turbine metals that are employed. The term "state-of-the-art gas turbine" does not imply a gas turbine which is specifically modified in a substantial way, designed or manufactured for the utilization of massive amounts of steam therein (i.e., steam comprising 5% or more of the total gas turbine mass flow) although the turbine section is designed for steam injection at lesser amounts. Further, the steam turbine is a state-of-the-art steam turbine which is produced specifically to be powered by steam. All the other equipment in the power plant could be commercially established state-of-the-art equipment. The thermal efficiency of the power plant of the present invention can reach or exceed 30% if the moisture content in the raw solid fuel is similar to that of bituminous coal.

DESCRIPTION OF THE PREFERRED EMBODIMENT

Figure 1:
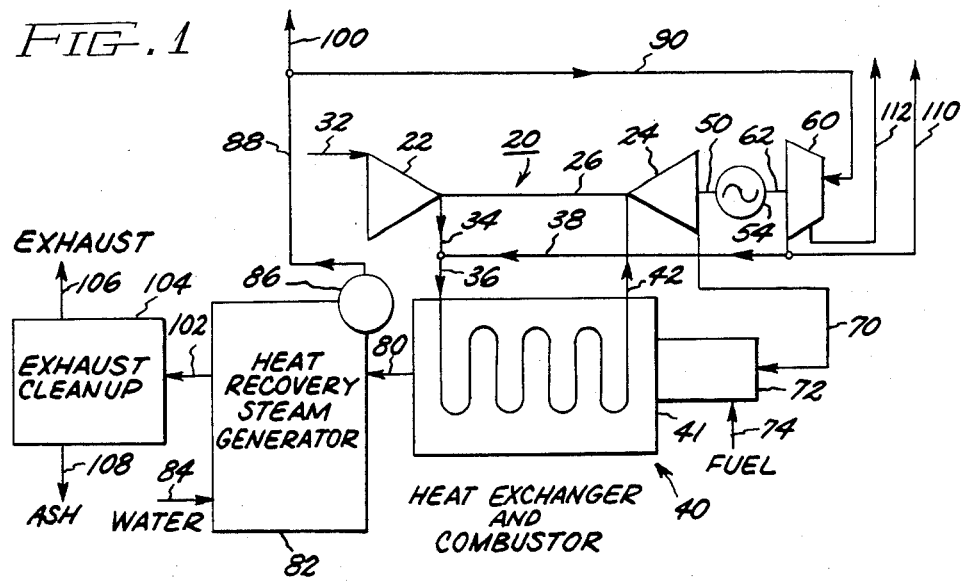
FIG. 1 is a schematic diagram of a state-of-the-art gas turbine and steam turbine system in which the gas turbine is powered by a mixture of steam and air, and in which the steam turbine is powered by steam, the motive fluids of both of which are heated by the burning of a solid fuel.

The schematic diagram of FIG. 1 is a simplified embodiment of the power plant of the instant invention. Generally, such a power plant comprises a gas turbine unit 20, which comprises a compressor section 22, and a turbine section 24, which for single shaft machines are directly connected via shaft 26. Two shaft gas turbine units could also be used and offer improved performance and operating flexibility in certain applications. However, for simplicity, only single shaft gas turbines will be discussed in this description. The conventional gas turbine is designed to operate at an optimum design point on its performance map with a predetermined, small amount of steam injection (normally less than 5%). Accordingly, air enters through inlet 32 into compressor section 22 where it is compressed to a pressure of about 7-15 atmospheres and then discharged through line 34. From line 34 it passes to line 36 after being mixed with spent steam passing through line 38. In the instant invention, it is generally preferred that there be utilized from about 5 to 50% by weight of steam in the motive gaseous mixture that passes to turbine 24. More commonly, there is utilized from 5% to 25% by weight of steam in the motive gaseous mixture that is utilized to power turbine 24 The specific percentage of steam in the gas turbine motive gases will be selected to optimize the power and efficiency of the gas turbine section, and will depend on the difference between rated temperature for the state-of-the-art gas turbine and the actual turbine inlet temperature that is utilized. Increasing amounts of steam can be utilized in a state-of-the-art gas turbine as this temperature difference is increased up to the point where the turbine pressure ratio exceeds its rated design value and the compressor section is threatened by aerodynamic stall. On the other hand, if less than 5% of steam is utilized in the motive gas mixture, then the advantages of the instant invention are not realized.

Accordingly, the motive gaseous mixture of steam and compressed air passes through line 36 into combined heat exchanger and combuster 40 where it is heated to a temperature generally in the range of 1200° to 1500° F. The pressure level of the steam and gas mixture at the heat exchanger discharge 42, is determined by the pressure drop across the gas turbine expansion flow path, 24.

The motive gaseous mixture passes out of combined heat exchanger and combustor 40 through line 42 into gas turbine 24 where it drives the gas turbine which in turn drives generator 54 through drive turbine shaft 50. Generator 54 is connected in tandem with a steam turbine 60 on the same shaft 62 such that both gas turbine 24 and steam turbine 60 power and drive generator 54 through shafts 50 and 62, respectively.

The exhaust gases from turbine 24 are discharged through line 70 into combustor 72 which comprises one part of combined heat exchanger-combustor 40. There is added to said combustor 72 fuel, which most commonly will be low-grade solid fuel such as wood or coal, through line 74 to be burned in the combustor. After being burned therein, the gases of combustion, including fuel impurities and particulates pass into heat exchanger 41 of combined heat exchanger and combustor 40. Reduced in temperature, the cooled combustion gases from heat exchanger 41 pass through line 80 into heat recovery steam generator 82 (which may be of the single or multiple pass type) where feed water added, through line 84, is converted to superheated steam, at a pressure typically between 400 psig and 1250 psig. Saturated steam collected in steam drum 86 is returned to superheater coils (not shown) in heat recovery steam generator 82 before being passed from heat recovery steam generator through line 88 and then through line 90 to drive steam turbine 60. Steam is exhausted from steam turbine 60 at a pressure slightly in excess of the discharge pressure of compressor 22, typically at 100-200 psig, and is then passed through line 38 to be mixed with the compressed air stream passing through line 34. Additional high pressure, superheated steam can be generated in heat recovery steam generator 82 and drawn from line 88 through line 100 to supply high pressure process steam for use somewhere else in the plant. Additionally or alternatively, lower pressure steam for plant process purposes can be drawn from line 38 via line 110 or from steam extraction stages provided in turbine 60 via line 112.

The spent combustion gases from the heat recovery steam generator 82 pass via line 102 to an exhaust clean-up unit 104. Exhaust clean-up unit 104 may either be a bag filter, an electrostatic precipitator or some other means of removing fine particulate matter or other undesirable gaseous species from the exhaust combustion gas stream. After the exhaust combustion gases have been cleaned up, they are then passed out through stack 106 to the atmosphere and the collected ash is disposed of through line 108.

With respect to this embodiment, all of the equipment is state-of-the-art, operating at one or more of its technical design limits. For example, the gas turbine operates at about the same specific power density as it would have if operated as a simple cycle machine even though the turbine inlet temperature of the motive gas stream may be considerably less. This is because its mass flow through its gas expansion path has been increased by steam injection into the compressor air flow stream. The steam turbine operates at its own particular specific power density limits. The heat exchanger operates at the limiting temperature which its materials can tolerate when exposed to the hot stream of dirty combustion gas. This characteristic (operation at state-of-the-art conditions) is conducive to low cost plant design. The combined heat exchanger and combustor can either be one unit or can be separate units as is well-known in the art and as will be illustrated below. The fuel that is burned in combustor 72 can be any of the lower cost impure fuels mentioned previously, such as the solids (coal, biomass, peat and other types of such fuels), the low quality liquid fuels (residual oil, petroleum tars, etc.), or even premium "clean" fuels such as distillate oil or natural gas. This fuel flexibility and the ability to use low quality fuels should reduce fuel cost. The steam turbine generally adds 10-20 percent additional power and raises the power plant efficiency. Note that steam generated in the heat recovery steam generator 82 and reheated in the heat exchanger 41 expands through two turbine stages in a superheat/reheat non-condensing steam cycle, while the gas turbine compressed air expands in a superimposed Brayton cycle.

Power plants constructed in accordance with this invention will be particularly advantageous for power ratings ranging between 4,000 and 100,000 KW. Since most of the power is extracted by the gas turbine power stages, this range of ratings is consistent with the size of today's available state-of-the-art gas turbines. Furthermore, if renewable fuels such as wood are used, smaller ratings are consistent with a reasonable size of fuel collection radius. It is, of course, obvious that power plants of higher power can be designed in accordance with the instant invention. However, their economic advantages, both in the use of lower quality fuels and in capital cost are not as advantageous.

The power plant of the instant configuration is economically attractive not only because of its capability to burn a wide variety of fuels, including low cost solid grades, but also by using available state-of-the-art machinery, albeit in a new operating configuration. By operating this equipment at its practical power density and/or temperature limits, plant costs are minimized. By using the gas turbine power stages to expand both the gas turbine compressed air and the reheated steam, equipment costs are held to a minimum. By utilizing the heat recovery steam generator and the combustor to recover regeneratively the thermal energy in the gas turbine exhaust and combustion gas exhaust stream, relatively high thermodynamic efficiency is obtained despite a relatively low turbine inlet temperature requirement needed to protect the heat exchanger.

Figure 2:
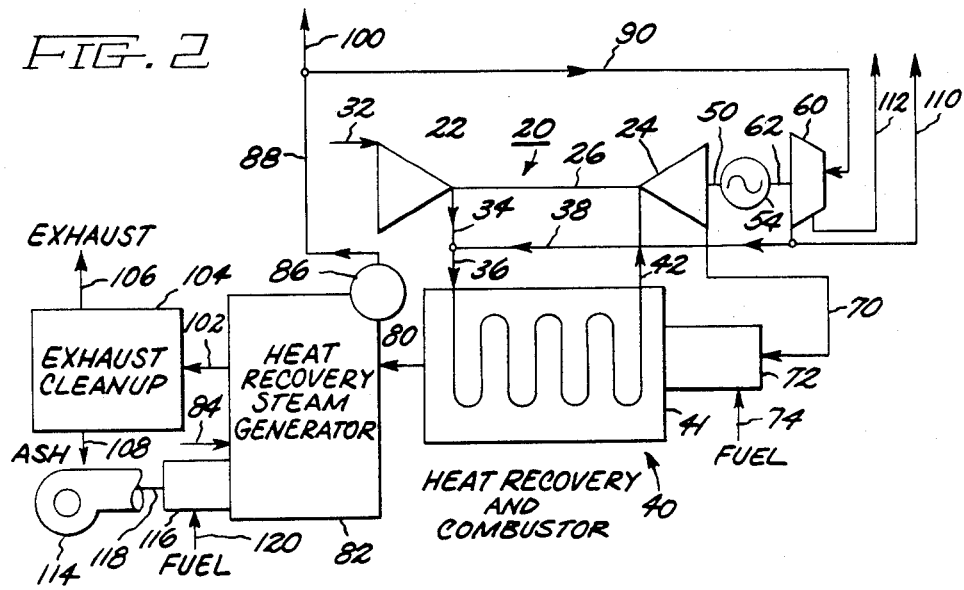
FIG. 2 is a schematic diagram of an alternate embodiment of the power plant of FIG. 1 utilizing an additional energy source in the heat recovery steam generator.

The embodiment of FIG. 2 differs from FIG. 1 in that it includes an additional auxiliary heating means associated with the heat recovery steam generator 82 comprising a blower 114 which forces auxiliary air into the auxiliary combustor 116 through line 118. Further auxiliary fuel is added to the auxiliary combustor which, depending on the type of auxiliary combustor and heat exchanger, may be either a "clean" fuel or any of the solid "dirty" fuels herein before mentioned. Such fuel is added through line 120 into auxiliary combustor 116 where it is burned to form gases which add further thermal energy to the heat recovery steam generator to produce as much steam, and at as high a temperature, as is desired for the operation of the steam turbine, as well as for the production of excess process steam as will be explained below.

All of the combustion gases then pass out of heat recovery steam generator 82 through line 102 to exhaust clean-up 104 where particulates and regulated noxious gases are removed from the exhaust gases by any of the flue gas clean up methods which are well-known in current industrial practice. The foregoing exhaust combustion gases are then passed out of exhaust clean-up system 104 through line 106 to be exhausted to the atmosphere. The ash that is removed from such exhaust gases is then passed out of the system through line 108 to be disposed of as is necessary. The steam produced in heat recovery steam generator 82 is collected in steam drum 86 where the water is separated from the steam. The saturated steam is then superheated before being discharged through line 88 into line 90 to drive steam turbine 60 in the same manner as the embodiment of FIG. 1. High pressure superheated steam for utilization in other parts of the industrial plant passes out from line 100 to be utilized wherever it is desirable. Lower pressure process steam, but slightly in excess of the discharge pressure of compressor 22, can also be drawn from the exhaust of steam turbine 60, or at pressures and temperatures intermediate between steam turbine inlet and exhaust conditions by use of one or more steam extraction stages in the steam turbine as is well-known in the art and as is depicted by steam extraction line 112 in the drawings. Naturally, as more steam is generated in heat recovery steam generator 82 by the combustion of additional fuel, line 120, more steam is available for industrial process use. Furthermore, as more steam is passed, in whole or in part, through non-condensing steam turbine 60 for extraction to process through lines 110 or 112, the electric power output of the plant can be substantially increased. Thus, there is provided a plant with considerable flexibility in the design stage and during operation to meet a range of power and process steam requirements at various temperature and pressure levels.

With respect to operating the steam turbine 60, it is desirable from an efficiency standpoint that the steam that is fed into such steam turbine through line 90 have a temperature generally in the range of 600°–950° F. and, more preferably, in the range of 600°–825° F.; and a pressure in the range of 400–1450 psig, and more preferably have a pressure in the range of 750–1250 psig. This will result in the steam turbine being operated at an internal efficiency in the range of 65 to 80%, depending on the steam turbine rating.

The utilization of non-condensing steam turbine 60 in the system of FIGS. 1 and 2 produces several significant advantages. First and fundamentally, it permits efficient recovery of thermal energy in the combustion gas stream exiting heat exchanger 41 through line 80 and its conversion to shaft power. Since the temperature of the combustion gas stream in line 80 is necessarily greater than that of the gaseous mixture entering the heat exchanger through conduit 36, and since the discharge temperature of compressor 22 is typically 450°–600° F., there is considerable thermodynamically available energy in this combustion gas before it enters heat recovery steam generator 82. Basic thermodynamics teaches that this potential will be lost if it is used merely to produce steam in the heat recovery steam generator 82 for direct injection into compressor discharge conduit 34. Second, recovery of this thermodynamic potential as shaft power is done in a simple way with a low cost non-condensing turbine 60 which is integrated into the indirectly-fired steam injected gas turbine cycle. Thirdly, the steam turbine 60 is available for start-up of the plant, merely by generating steam in heat recovery steam generator 82 or in an auxiliary pony boiler if desired, and passing this steam to turbine element 60 to provide cranking and acceleration power for the gas turbine. When the gas turbine reaches a self-sustaining speed, additional fuel can be added through conduit 74 for final acceleration of the plant to the speed and load demands for the desired power and/or process steam. In this, the steam turbine 60 replaces gas turbine cranking motors which otherwise are normally supplied.

Furthermore, use of steam turbine 60 permits cycle conditions and equipment requirements to be changed to minimize overall cost. For example, because the thermal energy and thermodynamic potential of combustion gases entering heat recovery steam generator 82 through conduit 80 will be recovered at high incremental efficiency, it is no longer necessary to strive to reduce their energy content to such a degree in heat exchanger 41. By permitting a larger "terminal temperature difference" between exiting combustion gas stream in conduit 80, and the gaseous motive stream entering in inlet conduit 36, the size of heat exchanger 41 can be substantially reduced. (There is a higher log mean temperature difference for the same heat delivery.) The reduced size for heat exchanger 41 substantially off-sets the cost of non-condensing steam turbine element 60. The higher discharge temperature for the combustion gases leaving heat exchanger 41 through conduit 36 allows higher enthalpy steam to be generated in heat recovery steam generator 82. By expanding this steam through steam turbine 60, its pressure and temperature are reduced to the same level as in an ordinary clean-fuel fired, steam injected gas turbine cycle. In other words, the quality and quantity of steam injected into the gas turbine engine section 24 is substantially the same as it would be without the steam turbine. This is significant since the mass flow of steam through steam turbine 60 affects the back-pressure on compressor section 22, and this back-pressure limits the amount of steam that can be injected (too much back-pressure will drive the compressor into stall). Thus, by extracting work through steam turbine 60 and thereby reducing the pressure and temperature of the steam, the compressor 22 is permitted to run at the same point on its compressor map (corrected weight flow, pressure ratio and speed). Accordingly, a modification to the compressor is not needed and a "state-of-the-art" compressor can be used. The work produced by steam turbine 60 is a favorable increment on plant power output which improves overall efficiency and reduces the cost per kilowatt for all plant components. Thus, it exerts major leverage not only on the fuel costs, but on capital costs as well. This advantage of this steam turbine is true for all the power plants shown in the Figures and is an inherent property of the power plants of the instant case.

Figure 3:
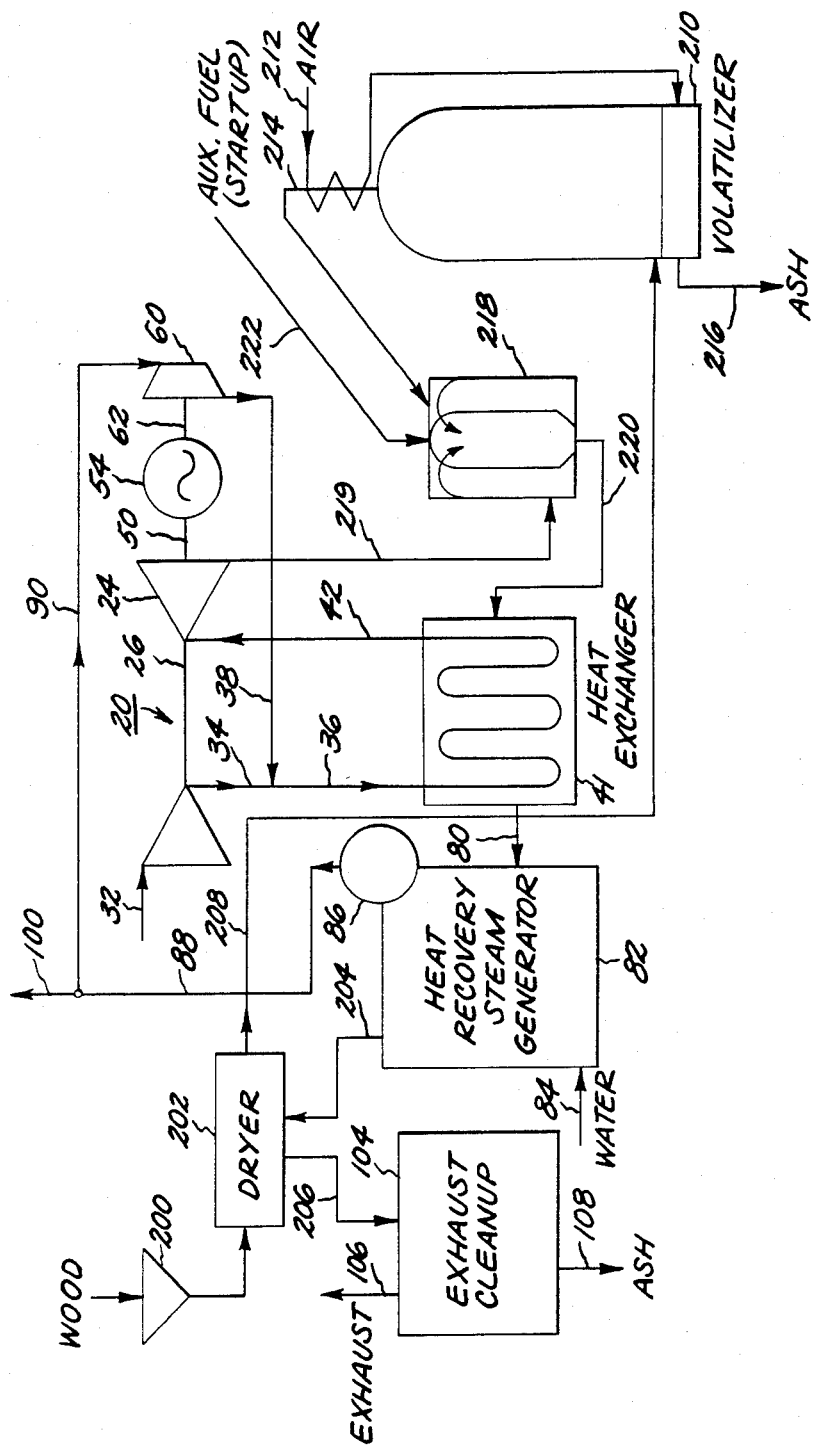
FIG. 3 is a schematic diagram of the preferred improved power plant of the instant invention utilizing a mixture of gases and steam to drive the gas turbine and utilizing steam to drive the steam turbine, wherein both the gases and the steam are formed by being heated indirectly through the burning of wood.

FIG. 3 is a further embodiment of the present invention in which a solid fuel (in this case wood) is volatilized to produce a relatively cleaner gas for combustion. Again, common elements are identified by common numbers for convenience.

Green wood having nominally 20-60% by weight of water enters processor 200 where it is crushed or shredded before passing on to a dryer 202 which receives a portion of the relatively dry combustion gases from heat recovery steam generator 82 via line 204. This efficient use of waste or excess combustion gases enhances the thermal efficiency of the overall system. After drying the wood, the combustion gases pass to the exhaust clean-up device 104 by means of conduit 206 in the usual manner. The dried wood (water content less than about 25%) is transported along line 208 to volatilizer 210. There the wood is burned to form volatile gases. Briefly, the volatilizer is a high temperature combustor in which the wood is converted to ash and volatile gases. Generally, air is introduced through line 212 which is pre-heated by passing counter-current to the heated volatile gases passing out of volatilizer 210 through line 214. The air passing in through line 212 which is pre-heated is then passed through the bottom of volatilizer 210 where it is used to combust the dried wood so as to form volatile gases and ash (which is removed from volatilizer 210 through line 216). The volatile gases are passed through line 214 and into gas combustor 218 where they are burned with the turbine exhaust gases from line 219 to form combustion gases which are passed through line 220 into heat exchanger 41. Gas combustor 218 is provided with an auxiliary fuel start-up line 222 for inserting auxiliary fuel in the system during system start-up. The embodiment of FIG. 3 is a preferred system using wood as the fuel. The power plant efficiency when using wood for the fuel may be significantly reduced if the moisture content of the fuel is high. All the fuel moisture is vaporized and passes through the system and up the stack, imposing significant latent heat losses not generally found with coal. Nonetheless, when corrected for this inherent loss associated with the fuel, the efficiency of this plant is very creditable and exceeds that of conventional wood fired steam power plants.

Figure 4:
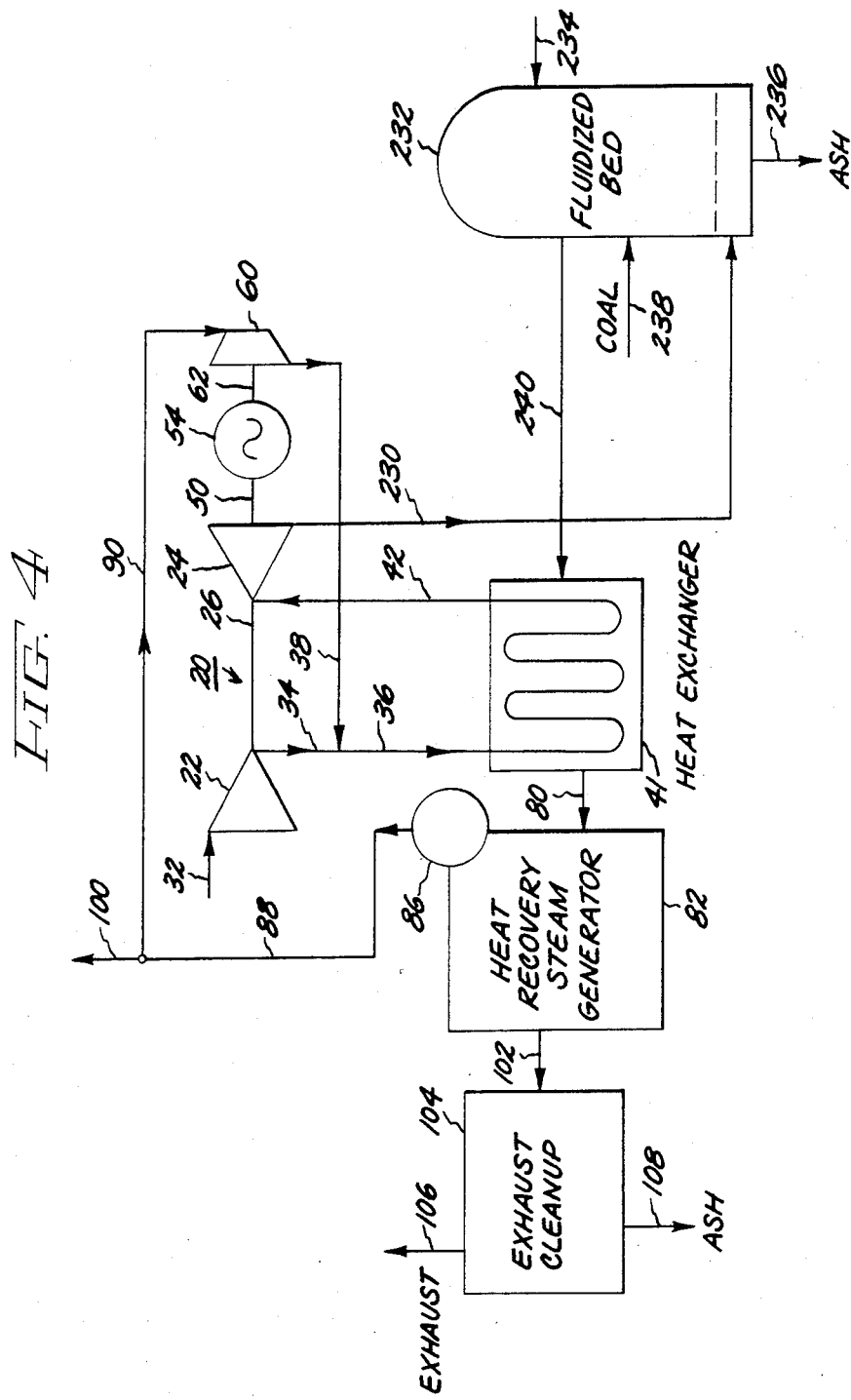
FIG. 4 is a schematic diagram of an improved power plant similar to that of FIG. 3, except in this case the gaseous mixture, as well as the steam in the heat recovery steam generator, are formed by the indirect heating of water through the burning of a coal slurry.

Another preferred system that can be utilized in the instant invention is a coal system. That is, the motive gaseous stream is heated indirectly by combustion gases formed by burning coal. Again, the basic system shown on FIG. 4 is similar to that of FIG. 1 and common components bear common designations. However, rather than using wood as the fuel as in the embodiment of FIG. 3, now the turbine discharge air is routed through line 230 for burning the coal in fluidized bed combustor 232.

The fluidized bed combustor 232 which can be of the type disclosed in U.S. Pat. No. 4,116,005, includes a plurality of sulfur sorbing particles forming a fluidized bed which is suspended above a grate by a stream of gas which passes therethrough. Sulfur sorbing particles are preferably calcine, limestone, (calcium carbonate or dolomite) calcium magnesium carbonate, typically 1/16 to ½ of an inch of maximum dimension. The particles capture sulphur dioxide during combustion of the coal or other solid fuels and also promote heat transfer. Fresh sulphur sorbing particles are inserted into the fluidized bed through line 234 and ash is removed from the combustor through line 236. The fuel, coal or any other appropriate solid fuel, is inserted into the fluidized bed through line 238. The combustion gases that pass out of combustor 232 are transmitted through line 240 into heat exchanger 41 where they indirectly heat the motive gas stream in the previously described manner.

The best mode for carrying out this invention has been set forth in the description above. In particular, this has been accomplished by setting forth preferred structural arrangements, materials and other unobvious variables incident to successful practicing (making and using) of the invention in the best way contemplated at the time of executing this patent application.

It should be obvious to one skilled in the art that certain changes can be made to the above-described invention without departing from the broad inventive concepts thereof. For example, other combustors for burning solid, relatively "dirty" fuels could be substituted for those examples disclosed herein without compromising the contribution of steam turbine 60 to the overall system. It is intended that the claims cover these and all other variations in the present invention's broader inventive concepts.

Having thus described the invention, what is claimed and desired to be secured by Letters Patent of the United States is:

1. An improved power plant comprising:
  (a) state-of-the-art turbine apparatus having a turbine section, and a compressor section driven in part by the turbine section for supplying pressurized air;

(b) a combustor for burning a solid or low quality liquid fuel to form combustion gases;

(c) a heat recovery steam generator receiving water and said combustion gases for converting said water to steam;

(d) a steam turbine driven by said steam for assisting said gas turbine section to drive said compressor section;

(e) means for combining steam discharged from said steam turbine with the pressurized air to create a motive stream;

(f) a heat exchanger receiving in heat exchange relationship said combustion gases and said motive gas stream for transferring heat from said combustion gases to said motive gas stream;

(g) means for routing the heated motive gas stream from said heat exchanger to said gas turbine apparatus to drive said turbine section; and (h) means for routing the motive gas stream from said turbine section into said combustor.

2. The improved power plant of claim 1 wherein said heat exchanger has associated therewith a first inlet line for receiving said motive gas stream, a first outlet line for discharging said heated motive gas stream, a second inlet line for receiving said hot combustion gases, and a second outlet line for discharging said combustion gases to said heat recovery steam generator.

3. The improved power plant of claim 1 wherein said steam turbine and said gas turbine section are drivingly connected to a generator for producing electricity.

4. The improved power plant of claim 1 wherein only a portion of said steam generated in said heat recovery steam generator is routed to said steam turbine.

5. The improved power plant of claim 1 wherein only a portion of said steam discharged from said steam turbine is combined with said pressurized air to form the motive stream.

6. The improved power plant of claim 1 further comprising an auxiliary combustor for receiving an auxiliary fuel and an auxiliary supply of air, the combustion products of which enter said heat recovery steam generator to enhance its steam producing capability.

7. The improved power plant of claim 1 wherein said solid fuel is wood; said combustor comprises a volatilizer for converting said wood to volatile gases and a gas combustor for burning said volatile gases; and wherein said motive gas stream from said turbine section is routed to said gas combustor for utilization in the combustion of the volatile gases to produce said hot combustion gases which are routed to said heat exchanger.

8. The improved power plant of claim 7 wherein the volatilizer and gas combustor functions are combined in a single combustor.

9. The improved power plant of claim 7 further comprising a dryer for reducing moisture content in the wood fuel, and means for routing said combustion gases from said heat recovery steam generator into said dryer to provide a source of heat for drying the wood, and means for routing the dried wood from said dryer to said volatilizer.

10. The improved power plant of claim 1 wherein said solid fuel is coal and said combustor comprises a fluidized bed combustor having a first inlet for receiving the motive gas stream from said turbine section and a second inlet for receiving the coal.

11. The improved power plant of claim 1 wherein said fluidized bed combustor is provided with a third inlet for receiving sulfur sorbing particles.

12. A method of operating a power plant including a state-of-the-art gas turbine engine having a compressor section with a compressor inlet and a compressor discharge for driving a turbine section, the turbine being designed to operate with steam injection and each section optimized to operate at predetermined design conditions on their associated performance maps, the method comprising the steps of:

(a) compressing air in said compressor section to a higher pressure at compressor discharge than at compressor inlet;

(b) burning a solid or low quality liquid fuel in a combustor to form hot combustion gases;

(c) transferring part of the heat from said hot combustion gases to a gas turbine motive gas stream by means of a heat exchanger, and transferring an additional portion of this heat to water in a heat recovery steam generator to form steam having a pressure substantially higher than that of the air at the compressor discharge;

(d) expanding the steam through a steam turbine to reduce its pressure to substantially that of the air at compressor discharge;

(e) combining the steam from the steam turbine with the compressed air from the compressor section to form the motive gas stream, the quantity of steam so combined being controlled to establish a back-pressure on the compressor section which is substantially at its predetermined operating condition with adequate stall margin as though the steam was not combined with the compressed air;

(f) increasing the temperature of the motive gas stream by placing it in heat exchange relationship with the hot combustion gases so as to approximate the normal inlet conditions for the turbine section; and (g) expanding the motive gas stream through said turbine section to drive it at its predetermined operating condition.

13. The method of claim 12 further comprising the steps of burning additional fuel in the heat recovery steam generator so as to produce additional heat energy for converting an additional amount of water to steam, and utilizing the additional steam as process steam.

* * * * *